(12) United States Patent
Gunzelmann et al.

(10) Patent No.: US 7,433,436 B2
(45) Date of Patent: Oct. 7, 2008

(54) TIMING CONTROL CONFIGURATION AND METHOD FOR MOBILE COMMUNICATIONS SYSTEMS

(75) Inventors: Bertram Gunzelmann, Augsburg (DE); Gerhard Linnenberg, Augsburg (DE); Dietmar Wenzel, München (DE)

(73) Assignee: Infineon Technologies AG, Munich (DE)

( * ) Notice: Subject to any disclaimer, the term of this patent is extended or adjusted under 35 U.S.C. 154(b) by 1124 days.

(21) Appl. No.: 10/657,370

(22) Filed: Sep. 8, 2003

(65) Prior Publication Data

US 2005/0261014 A1   Nov. 24, 2005

Related U.S. Application Data

(63) Continuation of application No. PCT/DE02/00731, filed on Feb. 28, 2002.

(30) Foreign Application Priority Data

Mar. 8, 2001 (DE) .................... 101 11 204
Mar. 15, 2001 (DE) .................... 101 12 481

(51) Int. Cl.
*H04L 7/00*   (2006.01)

(52) U.S. Cl. ........................................... 375/356

(58) Field of Classification Search ............... 375/219, 375/220, 222, 223, 259, 356, 354, 377; 455/453, 455/461
See application file for complete search history.

(56) References Cited

U.S. PATENT DOCUMENTS 6,061,704 A   5/2000   Östman et al.
2002/0056014 A1*   5/2002   Nakagawa et al. ............. 710/5

FOREIGN PATENT DOCUMENTS

| DE | 696 04 273 T2 | 7/1997 |
| DE | 197 29 476 A1 | 1/1999 |
| DE | 198 56 401 A1 | 6/2000 |
| DE | 199 26 830 A1 | 12/2000 |
| EP | 0 782 276 | 7/1997 |
| WO | 98/21819 | 5/1998 |
| WO | 99/26336 | 5/1999 |
| WO | 99/27651 | 6/1999 |

* cited by examiner

*Primary Examiner*—Don N Vo
(74) *Attorney, Agent, or Firm*—Laurence A. Greenberg; Werner H. Stemer; Ralph E. Locher (57) ABSTRACT

A configuration for time control of a transmitting/receiving device in a mobile station has a system clock generator for producing a standard system clock for different time patterns is supplied to a programmable clock divider which produces an output clock corresponding to a time pattern that can be selected. An event controller carries out the time control of events on the basis of the output clock and of event information.

14 Claims, 5 Drawing Sheets

TIMING CONTROL CONFIGURATION AND METHOD FOR MOBILE COMMUNICATIONS SYSTEMS

CROSS-REFERENCE TO RELATED APPLICATION

This application is a continuation of copending International Application No. PCT/DE02/00731, filed Feb. 28, 2002, which designated the United States and which was not published in English.

BACKGROUND OF THE INVENTION

Field of the Invention

The invention lies in the communications field. More specifically, the invention relates to a system and a method for time control of a transmitting and/or receiving device in a mobile station in a communications system. The transmitting and/or receiving device is configured to transmit/receive signals in different mobile radio standards with different time patterns.

A large number of actions have to be initiated and control signals have to be produced in transmitting and receiving devices in mobile stations, and these are correlated in time with a specific time pattern, which is specific to the mobile radio standard.

A range of different standards have become established in recent years in the field of mobile radio, which are being developed further or will be replaced by new standards in the future. Known examples of mobile radio standards are GSM (Global System for Mobile Communications), the 8PSK (8-Phase Shift Keying) further development of GSM which is referred to as the EDGE (Enhanced Data Services for GSM Evolution) standard as well as various third-generation mobile radio standards that are based on CDMA (Code Division Multiple Access), such as UMTS (Universal Mobile Telecommunications System). A fourth-generation mobile radio standard is already being developed under the designation MBS (Mobile Broadband System).

The requirement for mobile stations for mobile radio is growing in the presence of different and/or competing standards. It is desirable for mobile stations to have the capability to support a number of mobile radio systems, or standards, at the same time. This is dependent on the mobile station being able to produce the various time patterns of the individual standards and being able to carry out suitable event control processes based on them.

The difficulty in this case is that different mobile radio standards generally use incompatible time patterns, that is to say the time patterns can generally not be changed to one another simply by clock division. In consequence, mobile stations which support different mobile radio standards have until now used a separate device for time control of the mobile station for each standard, and they are supplied with a system clock specifically matched to that standard. This solution satisfies the functional requirements, but has the disadvantage that it requires a large amount of chip surface area and a large number of components since a large number of circuit blocks are always required for the various system clock sources and time controllers.

Different system clock frequencies in one chip furthermore make the overall functionality of the component more difficult. This is so because, in addition to the control of events, signal processing processes such as D/A conversion are also dependent on the system clock frequency. A further disadvantage of a solution such as this is that the effort for designing an integrated circuit with different system clock domains is considerably increased, particularly with regard to the synthesis and the testability of the design.

SUMMARY OF THE INVENTION

It is accordingly an object of the invention to provide a timing control configuration and a timing control method for a mobile communications system, which overcomes the above-mentioned disadvantages of the heretofore-known devices and methods of this general type and which provides for a time control system of a transmitting and receiving device in a mobile station, which offers advantageous implementation preconditions and, in particular, requires only a small chip surface area. It is a further object of the invention to specify a method for time control of a transmitting and receiving device in a mobile station, which allows two or more mobile radio standards to be supported and in the process involves only a small amount of implementation complexity.

With the foregoing and other objects in view there is provided, in accordance with the invention, a timing control configuration of a transmitting and/or receiving device for a mobile station in a communications system, wherein the transmitting and/or receiving device is configured to transmit/receive signals of different mobile radio standards with differing time patterns. The timing control configuration according to the invention comprises:

a system clock generator for producing a standard system clock for the differing time patterns;

a clock divider connected to receive the standard system clock, the clock divider having a control input for setting a mean period duration of an output clock, and the clock divider generating an output clock corresponding to one of the differing time patterns, in accordance with at least one control parameter received at the control input; and an event controller connected to the clock divider and receiving the output clock, the event controller effecting a time control of events based on the output clock and event information.

With the above and other objects in view there is also provided, in accordance with the invention, a timing control method for a transmitting and/or receiving device in a mobile station of a communications system. As above, the transmitting and/or receiving device is configured to transmit/receive signals of different mobile radio standards with differing time patterns. The method comprises the following steps:

producing a common standard system clock for the differing time patterns;

producing an output clock corresponding to one of the differing time patterns on the basis of the standard system clock by presetting at least one control parameter via which the mean period duration of the output clock can be set; and controlling a timing of events based on the output clock and event information.

Accordingly, the configuration for time control has a system clock generating means for producing a system clock which is standard for different mobile radio standards with different time patterns. One major aspect of the invention is that this system clock, which covers a number of standards, is converted by means of a clock divider means (which has a control input via which the mean period duration of an output clock can be set) to an output clock which, corresponding to a control parameter which is applied to the control input, corresponds to a specific, selected time pattern from the different time patterns. On the basis of the standard-specific output clock which is produced by the clock divider means, and of event information which is generally likewise dependent on the standard, the time control of events in the transmitting and receiving device is carried out by a means for event control.

In particular, the invention makes it possible to use a system clock generating means whose clock frequency (system clock) is not a common multiple of the clock frequencies of the different time patterns.

A further advantageous refinement of the invention is characterized in that the preferably digital clock divider means is designed such that the clock frequencies of the different time patterns can be derived from the clock frequency of the system clock using a division factor in the form K/L, where L is an integer which, in particular, is not a power to base 2, in particular using any desired rational division factor. This makes it possible to support virtually any desired mobile radio standards, that is to say even those standards whose time patterns do not have a particular "simple" relationship to one another, by means of the configuration according to the invention.

A further advantageous refinement of the configuration according to the invention is characterized in that the clock divider means uses a completely digital clock divider. Analog circuit parts, such as PLLs (Phase Locked Loop), by means of which it is likewise possible to achieve virtually any desired rational division ratios, but in general only with a relatively high degree of complexity, are thus not required. Since the clock divider is designed to be completely digital, its accuracy can be chosen as required as a function of a word length of the digital values to be processed and of the system clock, and can be set without any tolerances.

A first preferred exemplary embodiment of the clock divider means according to the invention is characterized in that the digital clock divider has a phase accumulator which uses the system clock or a clock which is derived from the system clock to add a phase increment whose value can be predetermined variably by programming. Although, when the phase increment is accumulated, a discrepancy which increases with time can occur between the output clock and the desired clock pattern, it is possible by choice of an appropriate word length for the phase accumulator to keep this discrepancy sufficiently small that it remains acceptable from practical viewpoints. The major advantage of this configuration is that it has an extremely simple design.

An alternative second exemplary embodiment, which is likewise preferred, of the configuration according to the invention is characterized in that the clock divider means uses a fractional clock divider which allows exact clock division averaged over time. With a digital clock divider such as this, there is no discrepancy, averaged over time, between the phases of the output clock and of the clock of the time pattern to be reproduced.

One preferred embodiment variant of such a fractional clock divider is characterized in that the fractional clock divider has a register which can not only be incremented but can also be decremented, in that, with a division factor of K/L, the register is incremented using the system clock or a clock which is derived from the system clock with the value $\Delta INC=2K$, provided that the value held in the register is less than 0, and is otherwise decremented with the value $\Delta DEC=2\cdot(K-L)$, where K and L are positive integers and K<L, and in that the output clock is determined by a change in the mathematical sign of the value which is held in the register.

The accuracy of the clock division in the first exemplary embodiment and the circuit complexity of the second exemplary embodiment can be reduced by arranging an initial divider upstream of the clock divider, with an integer divisor, in particular a divisor which is not a power to base 2.

With regard to driving the event control on the basis of the output clock which is produced by the clock divider means, one advantageous refinement of the invention is characterized in that a resettable counter counts the output clock, and in that the means for event control has a table memory in which events are associated with counts which are dependent on the chosen time pattern or mobile radio standard, with the means for event control initiating an event when the counter has reached the count which is associated with that event. The resetting of the counter on reaching a specific count results in the frame structure being reproduced in the receiver, and allows the events to be initiated continually and repeatedly, always with the same timing within a (data) frame.

Other features which are considered as characteristic for the invention are set forth in the appended claims.

Although the invention is illustrated and described herein as embodied in a configuration for time control for mobile communications systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
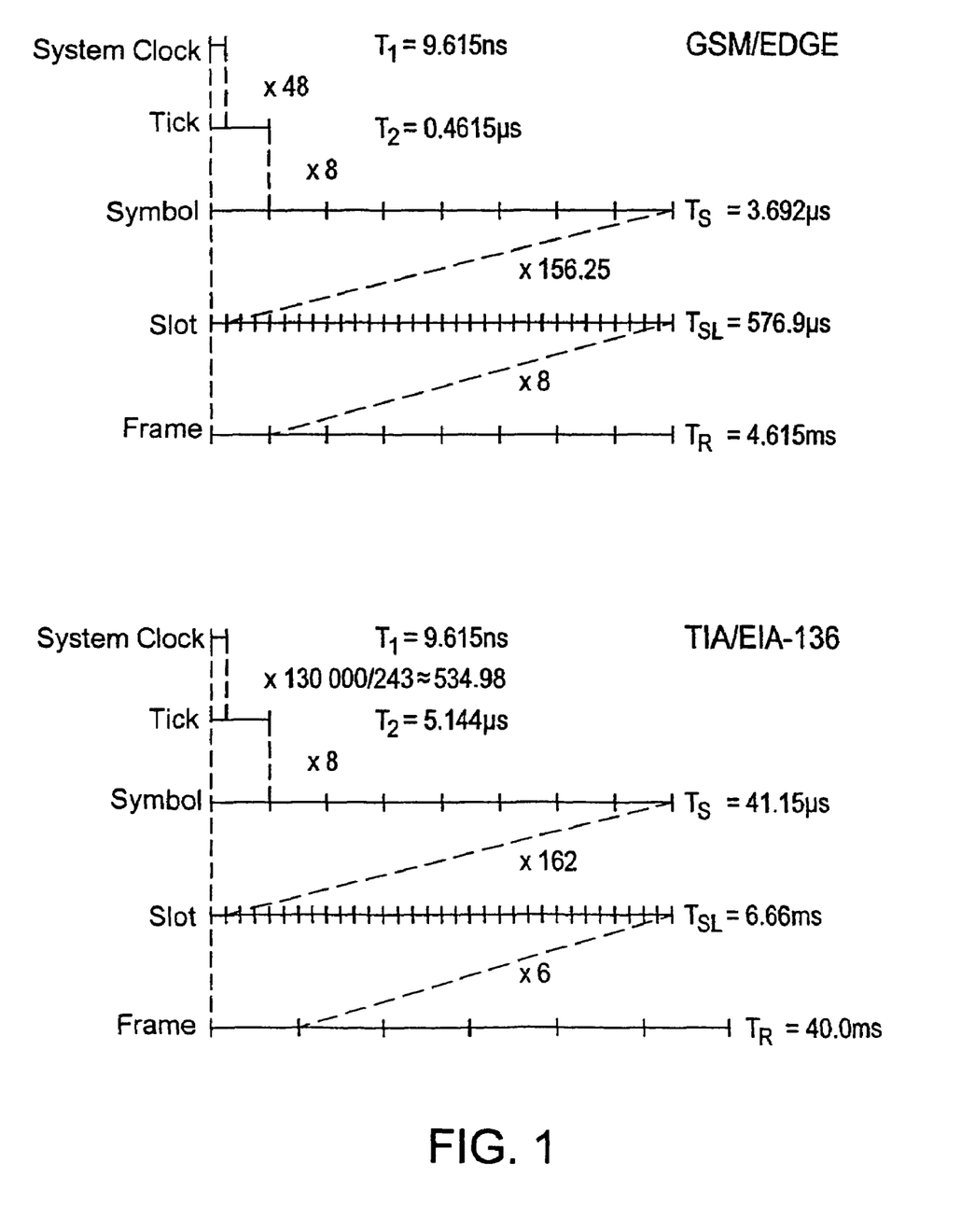
FIG. 1 is a schematic timing diagram illustrating various characteristic time durations in the GSM, EDGE and TIA/EIA-136 standards.

Referring now to the figures of the drawing in detail and first, particularly, to FIG. 1 thereof, there is shown the GSM/EDGE standard (upper portion of FIG. 1) and the TIA/EIA-136 standard (lower portion of FIG. 1), illustrating the standard-specific timings and a standard system clock as may be used, by way of example, in the invention.

The data transmission in mobile radio systems is organized in a predetermined, standard-specific time structure. The shortest time structure is the time pattern, on which all the data processing procedures in the system are based. One unit of the time pattern is referred to as a "tick" and forms the shortest time unit which can be used in the system.

The time durations which are defined in the standard are generated on the basis of the time pattern. These are the symbol time duration $T_S$ and, possibly (depending on the mobile radio standard being considered), the time duration for a time slot $T_{SL}$ and the time period for a frame $T_R$.

GSM and EDGE systems have the same time structure. The frame time duration is $T_R$=4.615 ms, and comprises eight time slots. The duration of a time slot is $T_{SL}$=576.9 µs and comprises 156.25 data symbols. A data symbol in turn has a duration of $T_S$=3.692 µs and lasts for 8 ticks. The time duration for a GSM tick is thus $T_2$=0.4615 µs.

In the TIA/EIA-136 standard, a frame lasts for $T_R$=40.0 ms and contains six time slots. One time slot lasts for $T_{SL}$=6.66 ms and comprises 162 data symbols. An individual data symbol has an associated data symbol duration of $T_S$=41.15 µs. As in the GSM standard, a data symbol lasts for 8 ticks, that is to say the time pattern for the TIA/EIA-136 standard is formed by ticks with a time duration of $T_2$=5.144 µs.

The invention provides for these two time patterns to be derived from one and the same system clock. A system clock at 104 MHz is assumed by way of example. The duration of one system clock cycle $T_1$ is then $T_1$=1/104 µs=9.615 ns.

In the case of GSM, $T_2$=48·$T_1$, that is to say 48 system clock cycles form a tick in the GSM time pattern. For TIA/EIA-136, $T_2$=(130000/243)·$T_1$=534.98·$T_1$.

Figure 2:
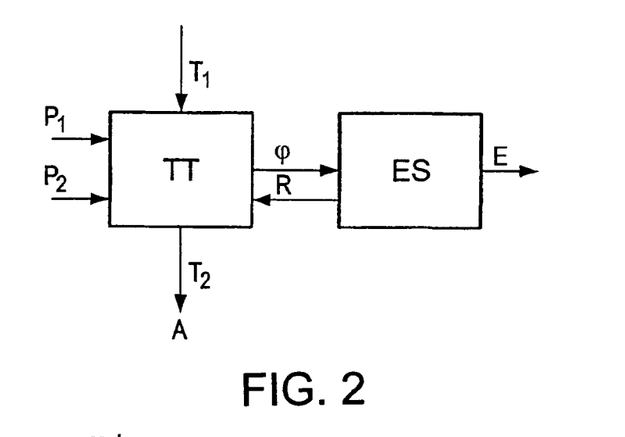
FIG. 2 is a schematic block diagram of a configuration according to the invention.

FIG. 2 shows a schematic illustration of the structure of an assembly according to the invention for time control of a transmitting and receiving device in a mobile station. The system has a digital clock divider TT and an event controller ES.

The digital clock divider TT is supplied with the standard system clock $T_1$ (for example at 104 MHz). An output clock signal A whose mean period duration corresponds to the duration $T_2$ of one tick is produced at an output of the digital clock divider. The digital clock divider TT is supplied with at least one parameter $P_1$ or $P_2$, by means of which the mean period duration of the output signal A or the tick time duration $T_2$ can be set or programmed in accordance with the desired standard.

Furthermore, the clock divider TT uses the output clock signal A to derive a control signal which indicates the instantaneous phase φ of the output clock signal. This control signal is passed to the event controller ES, allowing it to initiate predetermined events E at defined times or phase angles by simple comparison of a reference phase, which is associated with the event, with the instantaneous phase φ. After a specific phase or time duration, which in particular is dependent on the mobile radio standard, a reset signal R can be used to reset the clock divider TT, in order to ensure that the overall sequence is carried out in the correct cycle (normally the frame cycle).

Figure 3:
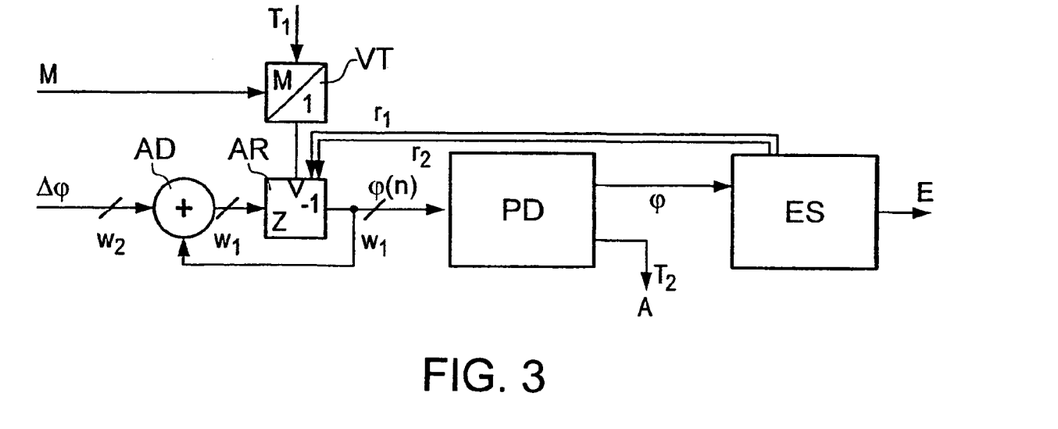
FIG. 3 is a schematic diagram of a first exemplary embodiment of the invention.

FIG. 3 shows a first exemplary embodiment of the configuration according to the invention. The clock divider TT has an initial divider VT, to which the system clock $T_1$ is supplied. The initial divider has an adjustable division ratio M, that is to say the clock time duration which occurs at the output of the initial divider VT is M·$T_1$, where M is a positive integer. The initial divider VT is optional, but offers advantages for certain applications, which will be described in more detail later.

The output of the initial divider VT is passed to the clock input of a phase accumulator register AR. The input of the phase accumulator register AR is connected to the output of an adder AD. One adder input of the adder AD is supplied with the output, delayed by one clock cycle, of the phase accumulator register AR, while the second adder input is supplied with a phase increment Δφ.

The output of the phase accumulator register AR forms the input signal for a phase decoder PD, whose method of operation will be explained in more detail in the following text. The phase decoder PD produces on the one hand the desired output clock signal A (with the mean period duration $T_2$) and on the other hand the phase signal φ, which is signaled to the event controller ES as shown in the illustration in FIG. 2. The event controller ES in this case produces two reset signals $r_1$ and $r_2$ for the phase accumulator register AR.

Figure 4:
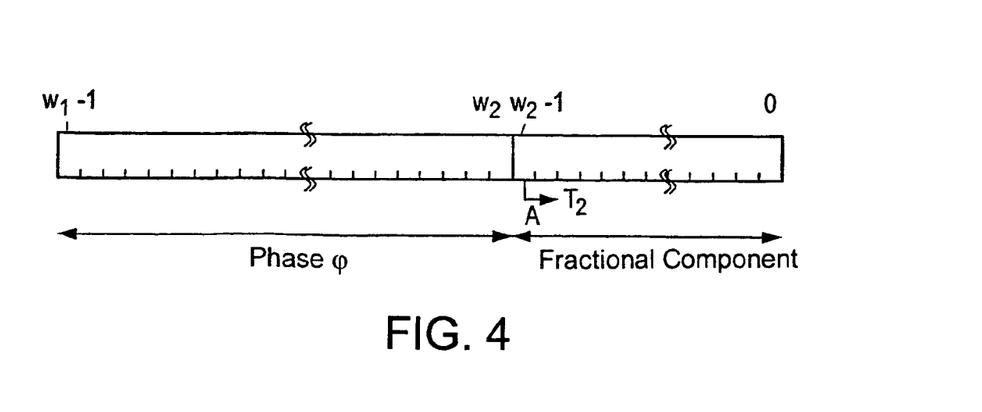
FIG. 4 is a schematic illustration of the accumulator register illustrated in FIG. 3.

The method of operation of the first exemplary embodiment of the invention, as shown in FIG. 3, will be explained in the following text with reference to FIG. 4. FIG. 4 shows the structure of the phase accumulator register AR and, in addition, indicates how the contents of the register AR are decoded in the phase decoder PD. In the exemplary embodiment, the phase accumulator register AR has a word length of $w_1$ bits, which are numbered consecutively 0, 1, ..., $w_1$-1. The $w_2$ least significant bits in the positions 0, 1, ..., $w_2$-1 of these are interpreted as a fractional part, while the remaining most significant bits represent the phase—measured in ticks—of the desired time pattern. By way of example, $w_1$ may be chosen to be 40, and $w_2$ to be 25.

First of all, depending on the mobile radio standard whose time pattern is intended to be reproduced, the values for the initial division factor M and for the phase increment Δφ are entered. N in the following text denotes the division ratio N=$T_2/T_1$ to be produced. With the (optional) choice of a suitable initial division factor M, the phase increment Δφ is set in accordance with the following equation:

$$\Delta\varphi = rnd\left(\frac{2^{w_2}}{N/M}\right) \quad (1)$$

In this case, "rnd" denotes the rounding of the expression in brackets (if necessary) to an integer. At the start of a time frame, the contents of the phase accumulator register AR, also referred to in the following text as the count φ(n), are reset. The initial resetting of the phase accumulator register AR is carried out with the aid of the reset signal $r_1$, and results in all $w_1$ bits in the register AR being reset. The phase accumulation which then takes place in the phase accumulator register AR can be described by the equation:

$$\phi(n)=\phi(n-1)+\Delta\phi \quad (2)$$

where n denotes the clock cycle produced by the clock $T_1$·M which is emitted from the initial divider VT, provided that M=1 as a result of the system clock $T_1$.

Normally, one time frame contains a number of ticks, with this number being characteristic of the respective mobile radio standard. With the GSM/EDGE standards, there are 10,000 ticks per frame (10,000=8 time slots/frame×156.25 symbols/time slot×8 ticks/symbol) and with the TIA/EIA-136 standard, there are 7776 ticks per frame (7776=6 time slots/frame×162 symbols/time slot×8 ticks/symbol).

The non-fractional component of the count φ(n) of the phase accumulator register AR is signaled continuously to the event controller ES via the phase signal φ. The rest of the operation of the clock divider TT according to the invention now takes place in such a way that, in all the subsequent frames, only the bits $w_2$ to $w_1$-1 at their start are reset with the aid of the second reset signal $r_2$, that is to say for the example of the GSM/EDGE standard, after reaching the value 10,000, and for the example of the TIA/EIA-136 standard, after reaching the value 7776. Resetting these most significant bits ensures that the integral error is governed solely by the word length $w_2$ of the "fractional tick". Furthermore, the periodic resetting of the phase accumulator register AR prevents it from overflowing.

The output clock signal A, which is divided on the basis of the predetermined parameters $\Delta\phi$ and (optionally) M, can be tapped off at the bit in the position $w_2$-1 and has an approximate duty ratio of 50%.

The time control of events in the mobile radio transmitter/receiver will be explained with reference to Table 1 in conjunction with the flowchart shown in FIG. 5.

TABLE 1

| No. | Count | Event |
|---|---|---|
| 1 | 10 | Event 1 |
| 2 | 345 | Event 2 |
| 3 | 1200 | Event 3 |
| . | . | . |
| . | . | . |
| . | . | . |
| K | 7768 | Event K |

By way of example, Table 1 shows a list of the events applicable to a given frame for the mobile radio standard TIA/EIA-136, with each event being associated with its corresponding tick count (that is to say its phase $\phi$) in the time frame. The first event should be initiated 10 ticks after the start of the frame, that is to say when the count is 10, with the second event being initiated at the count 345 and so on, and with a final event K being annotated for the count 7768. As already mentioned, the frame ends at the count 7776, and the phase $\phi$ is reset to the value 0.

Figure 5:
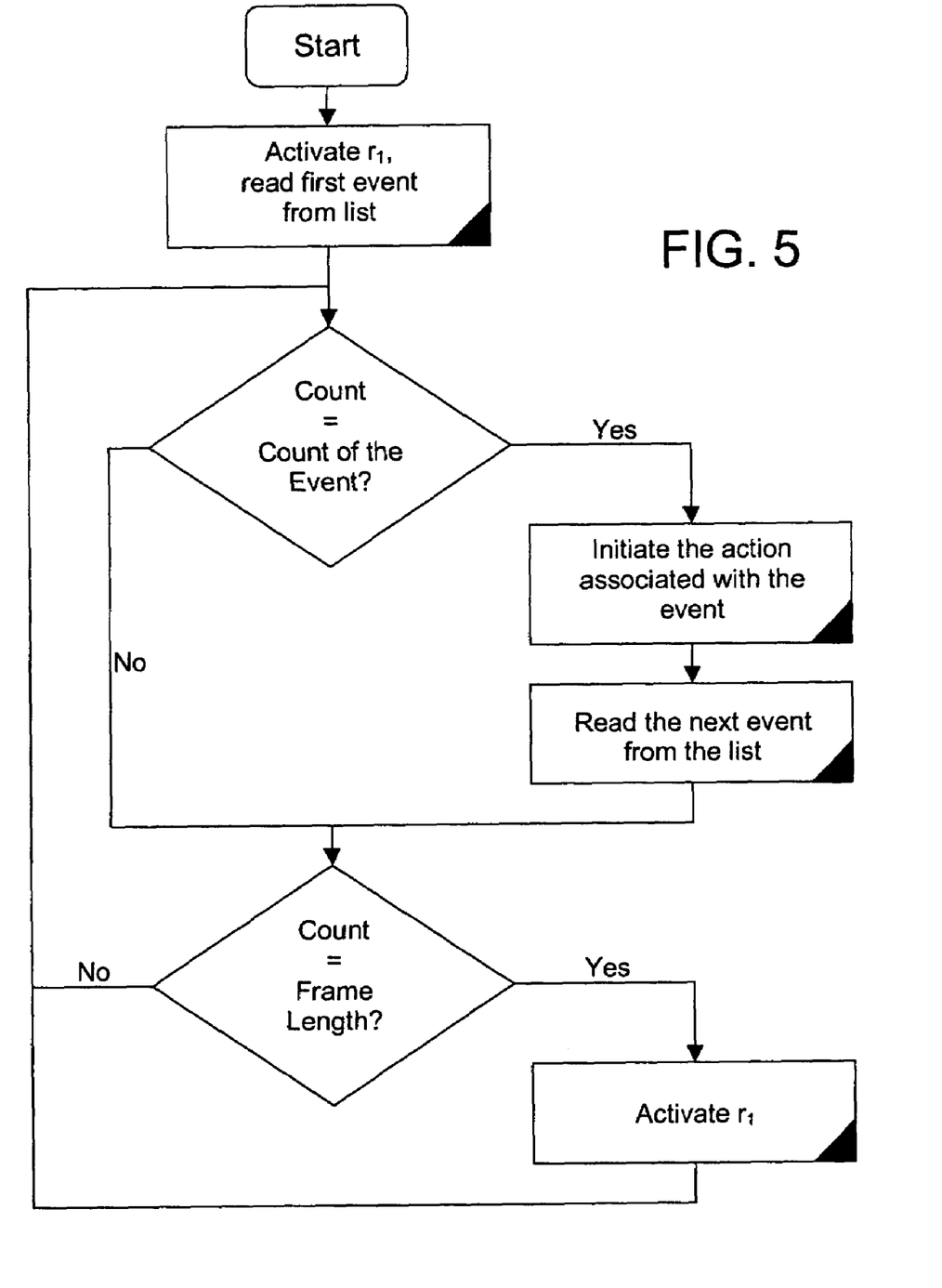
FIG. 5 is a flowchart explaining the event control process according to the invention.

As is shown in FIG. 5, once the transmitter/receiver has been initialized ("started"), the first reset signal $r_1$ is first of all activated. The first event (that is to say the event 1) is read from the list in the same step. Following this, in a comparison step, the tick count $\phi$ of the phase accumulator register AR is continually compared with the count for the event 1, as noted in the list. If a match is found, the action associated with that event is initiated and, in the next step, the next event is read from the list. In any case (that is to say even when no match was found for the previous count with a count noted in the list), the count is once again checked with reference to the overall length of the frame. As soon as the count indicates that the end of the frame has been reached, the second reset signal $r_2$ is activated. In any case, that is to say even when the end of the frame has not yet been reached, the process then returns to the next count for the first comparison step.

In principle, two different types of error can occur with the first exemplary embodiment:

A first error results from the finite nature of the clock frequency of the system clock $T_1$. This means that the initiation times of the events are subject to jitter. The initiation time for an event must not differ from its nominal time by more than half one clock period of $T_1$. According to the exemplary embodiment, the value of half a clock period of $T_1$ is 0.5·1/(104 MHz)=4.808 ns. An equivalent distribution can be assumed for the jitter error. The RMS jitter is in this case ⅓ of the maximum jitter, that is to say about 1.6 ns.

If this jitter time error is related to the time pattern to be produced (that is to say to $T_2$), or to the symbol time duration, then the relative values as stated in Table 2 are obtained for the system clock frequency of $T_1^{-1}$=104 MHz as chosen in the exemplary embodiment for the TIA/EIA-136 standard.

TABLE 2

| Standard | rel. RMS jitter (tick) | rel. RMS jitter (symbol) |
|---|---|---|
| TIA/EIA-136 | 312 ppm | 39 ppm |

The jitter is thus governed by the system clock $T_1$. The higher the system clock frequency, the less is the jitter.

It should be mentioned that the jitter error occurs only when the desired division ratio N cannot be set exactly by the phase increment $\Delta\phi$. This increment can be set exactly when N is an integer which can be represented as a finite sum of powers to base 2.

The use of the initial divider VT allows the jitter error to be eliminated in the situation in which N can be written as a product of an integer and a sum of powers to base 2. For example, this condition is satisfied for the system clock at 104 MHz, as considered here, for the GSM/EDGE standard with N=48=3·2⁴. In this case, the initial division factor is set to N=3, and the remaining division factor is set to $2^4$ by suitable choice of the phase increment $\Delta\phi$ for the phase accumulation. In this case, if $w_2$=25:

$$\Delta\varphi = rnd\left(\frac{2^{w_2}}{N/M}\right) = 2^{w_2}/16 \stackrel{w_2=25}{=} 2^{21} \quad (3)$$

The second type of error is based on the finite word length $w_2$ of the "fractional tick" in the phase accumulator register AR and leads as a result of the quantization process to an integral error which accumulates from frame to frame.

The integral error once again does not occur with GSM/EDGE since, when using the initial division factor (M=3), no rounding is required in equation 1, see equation 3. For the TIA/EIA-136 standard, a system clock frequency of 104 MHz together with M=1 and $w_2$=25 results in:

$$\Delta\varphi = rnd\left(\frac{2^{w_2}}{N/M}\right) = rnd\left(\frac{2^{25}}{130000/243}\right) \stackrel{w_2=25}{=} 62721 \quad (4)$$

The relative rounding error $\epsilon$ is thus:

$$\varepsilon = \frac{rnd\left(\frac{2^{w_2}}{N/M}\right)}{\frac{2^{w_2}}{N/M}} - 1 \stackrel{w_2=25}{\approx} 0.37 \text{ ppm} \quad (5)$$

and is thus well below the setting accuracy of known system clock oscillators.

The rounding error $\epsilon$ results in a discrepancy in the calculated phase in each tick in the sense of compression (if $\epsilon$ is positive) or expansion (if $\epsilon$ is negative) on the time axis, which results in an increasing discrepancy between the initiation times of the events and the nominal time as the frame time becomes longer. The integral error at the end of the first frame with a duration of $T_R$=40 ms is accordingly, with the TIA/EIA-136 standard:

$$\epsilon_{int}=\epsilon \cdot T_R=0.371 \text{ ppm} \cdot 7776 \cdot 10/1944 \text{ ms}=14.84 \text{ ns} \quad (6)$$

Figure 6:
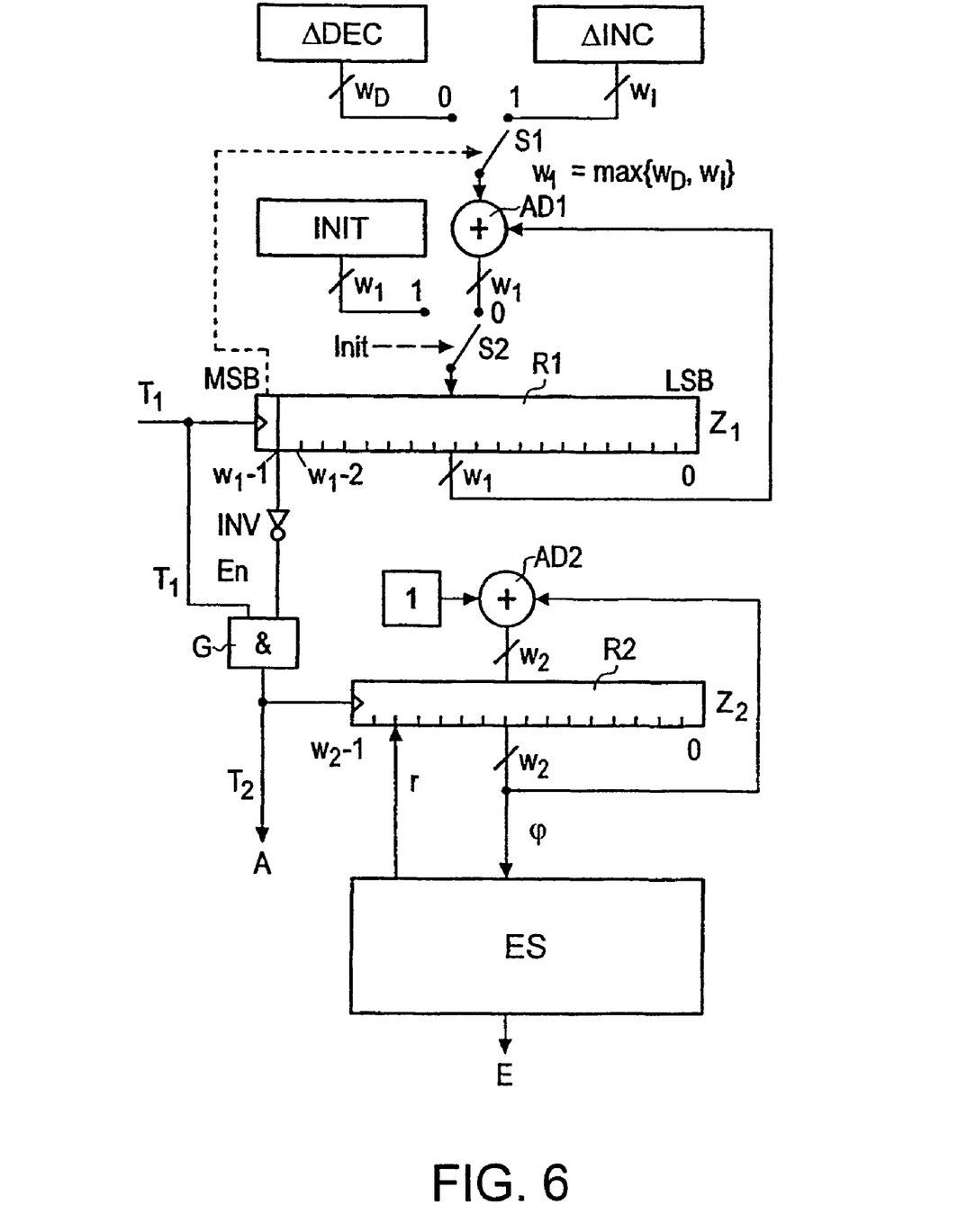
FIG. 6 is a schematic diagram of a second exemplary embodiment of the invention.

FIG. 6 illustrates a second exemplary embodiment of the configuration according to the invention for event control in a mobile radio receiver/transmitter. The circuit has a first counter, which is formed from a first register R1 and a first adder AD1. The first register R1 has a word length of $w_1$ bits, with the most significant bit MSB in the position $w_1-1$ in the first register R1 being a mathematical sign bit. This mathematical sign bit MSB is passed via an inverter INV to one input of an AND gate G, and provides an enable signal En at this input. The other input of the AND gate G is supplied with the system clock $T_1$, which is also supplied to the clock input of the first register R1.

The output clock signal A is produced at the output of the AND gate G with the mean clock period $T_2$, which reproduces the desired time pattern.

The output clock signal A is used to drive a second counter, which is formed from a second register R2 and a second adder AD2. The second counter counts the clock cycles of the output signal A, and supplies the count in the form of the phase signal $\phi$ to the event controller ES. The event controller ES controls various events in the manner already described on the basis of event information, and is connected via a single reset signal r to a reset input of the second register R2.

The major difference with the second exemplary embodiment is that the first counter AD1, R1 cannot only be incremented but can also be decremented by a second adjustable value. As will be explained in more detail in the following text, this makes it possible to approximate to division ratios not only by sums of powers of 2 (as is done by addition of the phase increment $\Delta\phi$ in the first exemplary embodiment) but for any desired rational division ratios to be provided, in particular even those with very large numerators and denominators, on average exactly, that is to say without any integral error.

One desired rational division ratio $T_1/T_2$ would be:

$$\frac{T_1}{T_2} = \frac{K}{L}, \quad (7)$$

where K and L are positive integers and K<L.

A decrement value $\Delta DEC$ and an increment value $\Delta INC$ are then initialized as follows:

$$\Delta INC = 2K$$

$$\Delta DEC = 2 \cdot (K-L) \quad (8)$$

Furthermore, a default value $INIT=2 \cdot K-L$ can be set.

The second input of the first adder AD1, which is not connected to the output of the first register R1, is connected to a first switch S1 via which the first adder AD1 is supplied either with the value $\Delta DEC$ (which is less than 0) or with the value $\Delta INC$ (which is greater than 0). A second switch S2 which is arranged on the input side of the first register R1 optionally allows the initialization of the first register R1 with the initialization value INIT, or the connection of the register input to the output of the first adder AD1.

The method of operation of the fractional clock divider will be explained in more detail with reference to FIG. 7. By way of example, let us assume K=2 and L=7. This results in $\Delta INC=4$, $\Delta DEC=-10$ and $INIT=-3$. $Z_1$ denotes the count of the first register R1.

First of all, the first register R1 is initialized at the time t=0 with the value $INIT=-3$ by switching the second switch $S_2$ to the position 1. The value INIT defines the null phase of the output clock signal A. After the initialization process, the second switch $S_2$ is moved back again to the position 0.

The first switch S1 is controlled as a function of the value of the mathematical sign bit MSB. As long as the mathematical sign bit MSB is equal to 1, that is to say the count $Z_1$ of the first register R1 is negative, the first switch $S_1$ is in the position 1. If the count $Z_1$ becomes zero or positive, the mathematical sign bit MSB assumes the value zero. This results in the first switch S1 moving to the position zero.

This rule means that the first register R1 is incremented while the count $Z_1$ is negative while, in contrast, it is decremented when the count $Z_1$ is positive (or if $Z_1=0$). In consequence, the count $Z_1$ continually fluctuates between positive and negative values, thus resulting in a periodic change in the mathematical sign bit MSB in the $w_1-1$ position in the first register R1.

Figure 7:
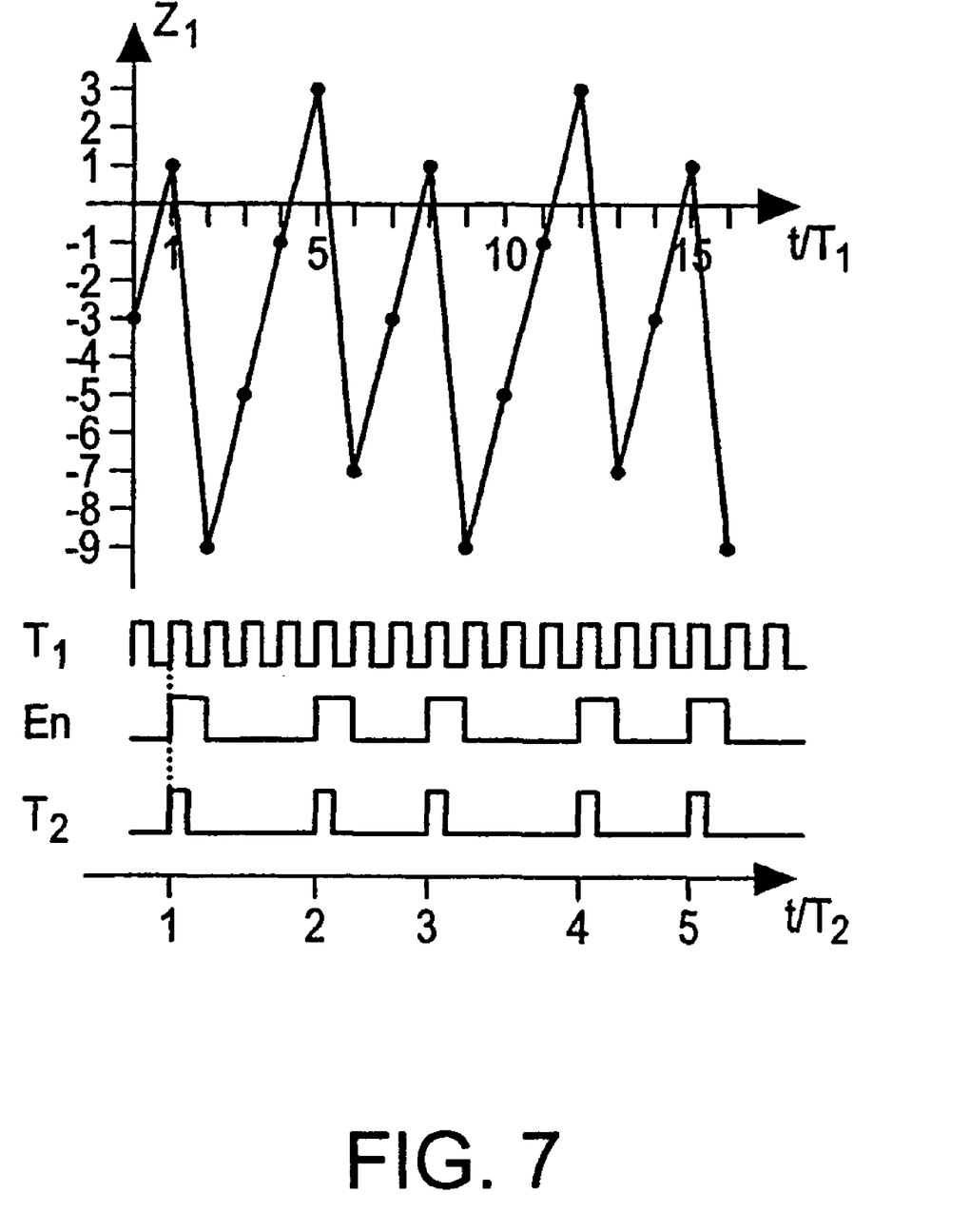
FIG. 7 is a timing and signal chart explaining the method of operation of the second exemplary embodiment.

The upper part of FIG. 7 shows the count $Z_1$ plotted against the clock sequence $t/T_1$ of the system clock $T_1$. The count $Z_1$ assumes the values −3, 1, −9, −5, −1, 3, −7, −3, 1, −9, −5, −1, 2, −7, −3, 1, −9.

The lower part of FIG. 7 shows the system clock signal $T_1$, the enable signal En and the output clock signal A or $T_2$ which is derived from $T_1$ or En respectively. The figure also shows the clock sequence $t/T_2$ of the time pattern that is produced. Averaged over time, $T_2/T_1=3.5$ exactly.

FIG. 7 clearly shows that the clock $T_2$ of the output clock signal does not have a duty ratio of 50%. However, this is not a disadvantage for most applications and, furthermore, further division by the factor 2 can nevertheless result in an approximately symmetrical duty ratio.

It will be readily understood that, with this exemplary embodiment, the numerator and denominator of the division ratio can be chosen freely and, generally, there is no need to round or quantize the division ratio. No integral error thus occurs (as already mentioned), although relatively long word lengths are required for certain ratios. The word length $w_1$ is in this case governed by the value $\Delta DEC$ or $\Delta INC$ which is needed to represent the largest magnitude, with a further bit being required in order to represent a negative two's complement number for $\Delta DEC$. The magnitude of the increment value $\Delta INC$ is often considerably less than $\Delta DEC$, so that, generally, a word length of $W_I < W_D$ is sufficient to represent $\Delta INC$, as shown in FIG. 6.

Table 3 shows the various values for K, L, INIT, $\Delta INC$, $\Delta DEC$ for the fractional divisor according to the second exemplary embodiment, for the example of a standard system clock at 104 MHz and for the TIA/EIA-136 and GSM/EDGE standards. As can be seen from Table 3, the word lengths have the minimum values $W_D=W_1=19$ bits, $W_I=9$ bits and $w_2=15$ bits.

The jitter error corresponds to the jitter error that occurs with the first exemplary embodiment.

TABLE 3

| Standard | K | L | INIT | ΔINC | ΔDEC |
|---|---|---|---|---|---|
| TIA/EIA-136 | 243 | 130000 | −126514 | 486 | −259514 |
| GSM/EDGE | 1 | 48 | −46 | 2 | −94 |

In summary, it can be stated that both exemplary embodiments allow the use of a single system clock for multiple standard transmitters/receivers with division ratios which need not correspond either to a power number to base 2 nor to a sum of power numbers to base 2, and need not be a "simple" rational division ratio $T_1/T_2=1/(integer)$, either. The use of a standard system clock, covering a number of standards (and which should, of course, be chosen to be the best possible system clock depending on the standards to be supported), is thus possible, thus considerably simplifying the design and implementation of a mobile radio receiver/transmitter such as this.

We claim:

1. A timing control configuration of a transmitting and/or receiving device for a mobile station in a communications system, wherein the transmitting and/or receiving device is configured to transmit/receive signals of different mobile radio standards with differing time patterns, the timing control configuration comprising:
a system clock generator for producing a standard system clock for the differing time patterns;
a clock divider connected to receive the standard system clock, said clock divider having a control input for setting a mean period duration of an output clock, and said clock divider generating an output clock corresponding to one of the differing time patterns, in accordance with at least one control parameter received at said control input; and
an event controller connected to said clock divider and receiving the output clock, said event controller effecting a time control of events based on the output clock and event information.

2. The configuration according to claim 1, wherein a clock frequency of the system clock is not a common multiple of clock frequencies defined in the differing time patterns.

3. The configuration according to claim 1, wherein said clock divider is configured to derive clock frequencies of the differing time patterns from a clock frequency of the system clock using a division factor in the form K/L, where K and L are positive integers, and K<L, and where L is not a power to base 2.

4. The configuration according to claim 1, wherein said clock divider is configured to derive clock frequencies of the differing time patterns from a clock frequency of the system clock using an arbitrary rational division factor K/L, where K and L are positive integers, and K<L.

5. The configuration according to claim 1, wherein said clock divider is a completely digital clock divider.

6. The configuration according to claim 5, wherein said digital clock divider includes a phase accumulator using the system clock or a clock derived therefrom to add a phase increment having a programmable value.

7. The configuration according to claim 5, wherein said digital clock divider includes a fractional clock divider allowing exact clock division averaged over time.

8. The configuration according to claim 7, wherein:
said fractional clock divider has a register capable of being incremented and capable of being decremented;
with a division factor of K/L, said register is incremented using the system clock or a clock derived therefrom with a value $\Delta INC = 2K$, provided that the value held in said register is less than 0, and said register is otherwise decremented with the value $\Delta DEC = 2 \cdot (K-L)$, where K and L are positive integers and K<L; and
the output clock is determined by a change in a mathematical sign of a value held in said register.

9. The configuration according to claim 5, which comprises an initial divider with an integer divisor preceding said clock divider in a signal flow direction.

10. The configuration according to claim 9, wherein the divisor is not a power to base 2.

11. The configuration according to claim 1, which comprises a resettable counter for counting the output clock; and wherein said event controller includes a table memory containing events associated with counts dependent on a chosen time pattern, and wherein said event controller is configured to initiate an event when the resettable counter has reached a count associated with the respective event.

12. The configuration according to claim 11, wherein said event controller is configured to produce a reset signal for resetting the resettable counter based on the chosen time pattern.

13. The configuration according to claim 1, wherein said clock divider is configured to produce time patterns based on at least two standards selected from the group consisting of GSM or EDGE, and TIA/EIA-136 and UMTS.

14. A timing control method for a transmitting and/or receiving device in a mobile station of a communications system, wherein the transmitting and/or receiving device is configured to transmit/receive signals of different mobile radio standards with differing time patterns, the method which comprises the following steps:
producing a common standard system clock for the differing time patterns;
producing an output clock corresponding to one of the differing time patterns on the basis of the standard system clock by presetting at least one control parameter via which the mean period duration of the output clock can be set; and
controlling a timing of events based on the output clock and event information.

* * * * *